Patented Nov. 28, 1939

2,181,538

UNITED STATES PATENT OFFICE

2,181,538

RUBBERIZING OF FABRICS AND AGENTS THEREFOR

Joseph I. Taylor, Elizabethton, Tenn., assignor to North American Rayon Corporation, New York, N. Y., a corporation of Delaware No Drawing. Application January 20, 1936, Serial No. 59,909

3 Claims. (Cl. 91—68)

The present invention relates to a composition of matter for treating cellulosic fabric to improve its adherence to rubber.

The primary object of my invention has to do with a composition of matter containing a hydroxylalkylamine.

Another object of this invention relates to the pretreatment of cellulosic fabrics composed of cotton, artificial silk or both with a composition containing a hydroxyethylamine, such as triethanolamine, etc.

A third object of my invention has to do with the preparation of a composition of matter for the aforementioned purpose by dissolving and/or dispersing an hydroxyalkylamine in a rubber solution or rubber mix.

Other objects of my invention will become apparent to those skilled in the art from a study of the following specification.

I am well aware that it has, heretofore, been proposed to embed cellulosic fabric, produced from rayon yarns, into rubber and to vulcanize the same by suitable and well known means. However, it has been found in actual practice that such fabric will not properly adhere to the surrounding rubber with the result that it easily peels off. This lack of adherence of rubber to fabrics or vice versa causes serious trouble especially in the manufacture of tires, rubber hose and the like products. By extensive experimentation, I have unexpectedly found that the adherence of rubber to cellulosic fabric may be greatly improved by treating the latter with a composition of matter containing an hydroxyalkylamine in dissolved and/or dispersed form. Such hydroxyalkylamines may be used having the chemical structure $H_xN(C_nH_{2n}OH)_y$ in which $C_nH_{2n}$ represents an alkylene radical, for example the $CH_2$ or methylene group, the ethylene radical $C_2H_4$, the propylene radical $C_3H_6$, etc., and in which $x$ and $y$ represent respectively the numbers 2 and 1, 1 and 2, and 0 and 3. These hydroxyalkylamines occur in three modifications, namely as mono-, di- and trihydroxyalkylamines, and I wish to emphasize that all of these derivatives may be used in accordance with my invention. These amines have the following structures:

(1) Monohydroxyalkylamines:
    $H_xN(C_nH_{2n}OH)_y$ in which $x=2$ and $y=1$ (2) Dihydroxyalkylamines:
    $H_xN(C_nH_{2n}OH)_y$ in which $x=1$ and $y=2$ (3) Trihydroxyalkylamines:
    $H_xN(C_nH_{2n}OH)_y$ in which $x=0$ and $y=3$ Although according to my invention, any hydroxyalkylamine may be used to promote the adherence of rubber to cellulosic fabric, I have found that triethanolamine is especially valuable for this purpose. Triethanolamine of commercial grade contains about 75% triethanolamine, 20–25% diethanolamine and 0.5% monoethanolamine, its molecular equivalent being about 133. This commercial grade may be used in my compositions as well as chemically pure ethanolamines.

In accordance with my invention, an hydroxyalkylamine, preferably commercial triethanolamine, is admixed with a rubber solution before being sprayed upon cellulosic fabric. Although the fabric tends to dry immediately after being treated with the ruber composition, it may be calandered to accelerate drying of the composition. The hydroxyalkylamine may be dissolved in the rubber solvent or merely dispersed therein. If ruber is dissolved for example in gasoline and subsequently triethanolamine added thereto, it will be found that the amine is completely soluble in the rubber solvent. However, I wish to emphasize that my invention is neither limited to rubber-gasoline solutions nor to triethanolamine, since any other rubber solution may be used in combination with any suitable hydroxyalkylamine having the aforementioned structure. Instead of dissolving and/or dispersing an hydroxyalkylamine, such as triethanolamine, in a rubber solution, it may be simply added to a rubber mix. Although the additions of an hydroxyalkylamine may be varied to a large extent, I have found that about 4 to 5% thereof, calculated on the rubber content of the solution or mix, are sufficient to cause a better adherence of rubber to cellulosic fabric. The term "cellulosic fabric" is used to embrace knitted or woven fabric made from viscose, cuprammonium cellulose, cellulose esters and ethers or mixtures thereof.

Modifications of my invention will be apparent to those skilled in the art, and I desire to include all such modifications coming within the scope of the appended claims.

I claim:

1. Regenerated cellulose fibers coated with rubber containing a small amount of an hydroxyalkylamine to increase the adhesion of the rubber to the fibers.

2. Regenerated cellulose fibers coated with rubber containing a small amount of an hydroxyethylamine to increase the adhesion of the rubber to the fibers.

3. Regenerated cellulose fibers coated with rubber containing a small amount of triethanolamine to increase the adhesion of the rubber to the fibers.

JOSEPH I. TAYLOR.